United States Patent [19]

Scheurer

[11] Patent Number: 5,277,742

[45] Date of Patent: Jan. 11, 1994

[54] APPARATUS FOR THE APPLICATION OF DECORATIVE RINGS AND THE LIKE TO ROTATIONALLY SYMMETRICAL RUBBER ARTICLES

[75] Inventor: Hans Scheurer, Munich, Fed. Rep. of Germany

[73] Assignee: Stahlgruber Otto Gruber GmbH & Co., Munich, Fed. Rep. of Germany

[21] Appl. No.: 601,753

[22] PCT Filed: Apr. 28, 1989

[86] PCT No.: PCT/DE89/00273

§ 371 Date: Oct. 30, 1990

§ 102(e) Date: Oct. 30, 1990

[87] PCT Pub. No.: WO89/10835

PCT Pub. Date: Nov. 16, 1989

[30] Foreign Application Priority Data

May 6, 1988 [DE] Fed. Rep. of Germany ....... 3815542

[51] Int. Cl.⁵ .............................................. B29D 30/72
[52] U.S. Cl. ................................... 156/397; 156/116; 156/447
[58] Field of Search ...................... 156/116, 117, 130.5, 156/130.7, 397, 394.1, 398, 408, 421.6, 447, 96, 156, 361, 543, 574; 152/524, DIG. 12; 157/13; 51/106, DIG. 33

[56] References Cited

U.S. PATENT DOCUMENTS

| | | | |
|---|---|---|---|
| 3,218,208 | 11/1965 | Molen | 156/116 |
| 3,427,215 | 2/1969 | Crocker | 156/116 |
| 3,574,040 | 4/1971 | Chitwood et al. | 156/350 |
| 3,698,651 | 10/1972 | Miller | 156/425 |
| 3,775,219 | 11/1973 | Karlson et al. | 156/363 |
| 3,810,805 | 5/1974 | Goldsworthy et al. | 156/361 |
| 3,944,457 | 3/1976 | Podvin et al. | 156/405.1 |
| 3,989,563 | 11/1976 | Schelkmann | 156/96 |
| 4,009,072 | 2/1977 | Schultz et al. | 156/584 |
| 4,222,810 | 9/1980 | Ytterstrom | 156/395 |
| 4,750,965 | 6/1988 | Pippel et al. | 156/361 |

FOREIGN PATENT DOCUMENTS

2386413 11/1978 France .
229332 12/1984 Japan .

*Primary Examiner*—Geoffrey L. Knable
*Attorney, Agent, or Firm*—Penrose Lucas Albright

[57] ABSTRACT

An apparatus to apply circular strips to pneumatic tires while still mounted on their wheels' rims comprising a turntable with a centered, spring supported member having a conical surface, which is slidable vertically on a shaft that rotates the turntable. The tire is horizontally disposed and frictionally engages the table while held by the centering member. The tire's sidewall is cleaned and then roughened by a chemical roughner. An application wheel supported from the turntable's framework via an adjustable bracket which includes a telescopic horizontal member is adjusted to bear directly against the sidewall at the desired location and inclination. The housing carries electrically energized heating cartridges to heat the surface to 150° C., or alternatively receives a heating block for the same purpose. A preprepared strip is mounted on a spool supported adjacent the housing. A guide having interchangeable plastic inserts for specific strips is mounted adjacent the housing to feed the strip under the heated application wheel so that a strip twenty millimeters in width may be applied to an automobile tire in ninety seconds. The application wheel is pressed by a pneumatic piston and cylinder against the tire at a pressure of about three to eight bars, the tire's internal pressure being about two bars. The application wheel may have a rim or shallow teeth that prevent the tire from moving laterally while being rotated.

3 Claims, 2 Drawing Sheets

APPARATUS FOR THE APPLICATION OF DECORATIVE RINGS AND THE LIKE TO ROTATIONALLY SYMMETRICAL RUBBER ARTICLES

BACKGROUND OF THE DISCLOSURE

This invention relates to apparatus for applying decorative rings, concentrically arranged inscriptions, labels, ornamental designs and the like, to rotationally symmetrical rubber articles, especially to the visible surface disposed inboard of the treads of pneumatic tires. Vehicular tires provided with such decorative rings are known generally as "whitewalls". But with the present apparatus, rings of one or more colors of variable widths may be readily applied to the tires, also letters, symbols or other decorations, may be arranged in one or more concentric rings.

Methods and apparatus for applying similar decorative rings and the like, according to the present state of art, are generally applied to the tires after removing them from the rims of their supporting wheels. Such processes are therefore complicated and somewhat time-consuming. There is a known method in which the tire remains on the wheel's rim as well as on the vehicle (see British Pat. No. 1,592,003), but according to this method, the entire vehicle is placed on an elevating platform, and preliminary preparation techniques include cutting an annular groove in the side walls of the tire by means of a manually operated grinding wheel, whereby considerable expertise is required to produce the precise rounded groove of uniform width necessary for the success of the operation.

U.S. Pat. No. 3,218,208 of Molen discloses a device in which the groove required for embedding a decorative strip on a vehicle tire may be formed mechanically independently of an operator, with the tire remaining on the wheel's rim. To accomplish this, the apparatus comprises a vertically arranged rotatable shaft, on the end of which the wheel may be secured by means of a centering cone. A milling cutter, driven by a rotatable shaft fastened to an adjustable arm, cuts a groove into the side surface of the pneumatic tire mounted on the wheel's rim. But, the process of embedding a color strip into a vehicular tire, together with the necessary vulcanization process, cannot be performed by this device.

French Patent 2,386,413 for repairing tire treads or shoulders, discloses a device by which rubber strips may be applied on a vehicle tire when removed from the wheel's rim. To accomplish this, the tire is vertically disposed on a support surface and rolled, engaged on both sides with rotating driving disks, which simultaneously position the tire whereupon, on each of both sides, a rubber strip is pressed simultaneously against the tire by a rubber roller or brush. This device, however, is not intended for the application of decorative rings. With a vertically disposed tire, monitoring the precise placement of decorative rings is also difficult without removing the tire from the device; also, with this device, strips which have been pressed on must then be vulcanized together with the tire by a special vulcanizing apparatus.

Cutting an annular groove in the side surface of a modern tire, into which groove a prefabricated decorative ring may be embedded after napping (roughening) and coating with a vulcanizing solution, is disadvantageous to the stability and strength of the tire. Pressure and heat are required to vulcanize the tire surface in a mold and the complicated process which is involved is aggravated by the fact that modern tires have very thin rubber sides.

SUMMARY OF THE INVENTION

A primary object of the present invention is to provide an apparatus for applying at least one decorative ring to a tire mounted on a vehicular wheel's rim, as well as a rapid process for performing the operation without requiring the preliminary cutting of a groove on the tire surface. An apparatus is disclosed for applying decorative rings, inscriptions or labels, arranged to be formed in either a single or several concentric rings, to rotationally symmetrical articles, especially to those visible surfaces lying adjacent to, and inboard of, the tread of a pneumatic tire while still mounted on its wheel's rim, which includes a rotating table to support and retain the tire as it is processed. This table is rotated by a shaft rigidly connected to it, the process being performed by a heated application wheel, mounted in a housing, which may be adjusted to exert a suitable pressure against the tire surface for applying and vulcanizing thereto a color strip. The color strip is provided from a separate supply source and applied with a vulcanized backing layer onto the tire by rotating the tire on a rotating table under the heated application wheel.

BRIEF DESCRIPTION OF THE DRAWINGS

The invention depicted in the drawings described herein illustrates a preferred embodiment which, however, should not be considered limiting, and other objects, adaptabilities and capabilities of the invention will be appreciated by those skilled in the art, reference being had to the accompanying drawings, in which.

DESCRIPTION OF THE PREFERRED EMBODIMENTS

Figure 1:
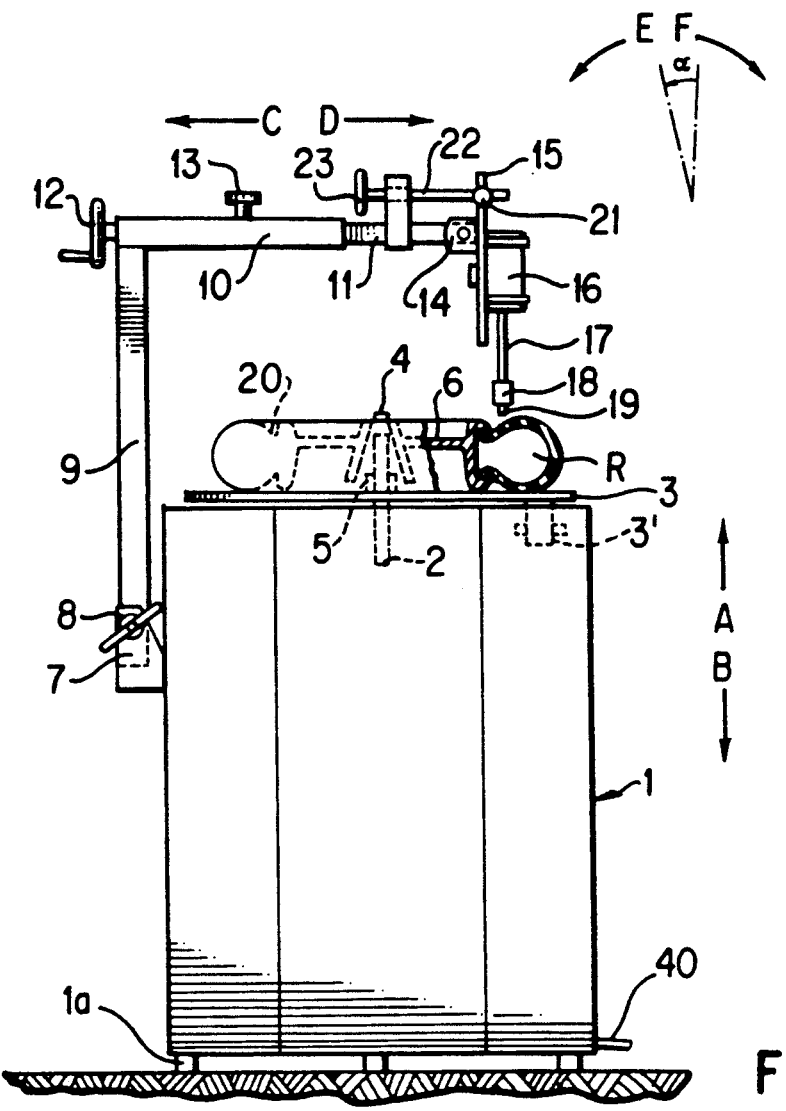
FIG. 1 is a side elevational view of a preferred embodiment of the apparatus according to the invention, shown diagrammatically and in reduced scale.

Reference numeral 1 generally designates an apparatus comprised of steel profiled beams structured to constitute a framework 1a, covered by sheet metal, plastic or other suitable material. A shaft 2 is vertically mounted on framework 1a, which may be rotated in an suitable manner by means of a speed reduction mechanism, for example a belt drive, powered by an electric motor or other power source which is supported by framework 1a and controlled by the operator. The electric motor and controls therefor are not shown or otherwise described as being well within the skill of the art. Shaft 2 is rigidly, or at least relatively nonrotatably, connected to a table 3, which is of a diameter suitable for supporting vehicular pneumatic tires of various dimensions. A centering cone 4 is received on the upper part of shaft 2 which preferably may be also mounted so as to be nonrotatable in relation to shaft 2 while being capable of sliding relative to shaft 2 in directions of arrows A and B. Cone 4 is preferably borne by a supporting compression spring 5 and is of suitable configuration and dimensions to be capable of readily adjusting to corresponding modern standard vehicular wheel openings of various dimensions. If required, a larger cone may be placed upon centering cone 4 of equal inner and greater outer diameters in relation to cone 4, preferably made of hard rubber, for centering larger tires such as truck tires. As a result of this variable dimensioning, together with the resilient support of centering cone 4 by spring 5, a pneumatic tire R, mounted on wheel 6, is readily received so that its bottom surface rests against and engages rotating table 3, in a manner to rotate together with table 3. A friction layer (not shown) of rubber applied to the upper surface of table 3 may advantageously ensure the simultaneous rotation of the surface of the table 3 and tire R. Tire R together with wheel 6 are readily placed on centering cone 4 and are removable therefrom from above same either manually or with assistance of an appropriate transporting mechanism.

To prevent any unwanted swinging or canting of rotating table 3 during its rotation with tire R mounted thereon, at least one track-supporting roller 3' is mounted by framework 1a so as to rotate freely and to engage and support the bottom of table 3 at its upper aspect.

A support arm 9 is mounted from framework 1a opposite roller 3', as illustrated in FIG. 1. It is pivotably received in a fork-like side bar 7 (rigidly connected to framework 1a) and, being pivotally mounted relative thereto, is selectively secured in a desired position by a tightening nut or bolt 8 which includes a rigidly connected handle for manual tightening or loosening of same. A tube 10 is fastened at a right angle to arm 9, forming a bracket, preferably of quadrangular cross-section as illustrated. A further arm 11 fits telescopically into tube 10, which may be readily adjusted in the directions indicated by arrows C and D through a spindle (not shown) controlled by handwheel 12. A set screw 13 assists in retaining the desired adjustment of spindle (not shown) by means of handwheel 12.

Support arm 9, which is preferably of circular cross-section, may be arranged in a suitable bearing corresponding to side bar 7 so as to be rotatable relative to its vertical axis whereby the bracket comprised of arm 9 and tube 10 need not be tilted to the rear, as illustrated, but may be pivoted about an arc to either side, away from the area above the table 3. In such case, or in any event, the bracket comprised of arm 9 and tube 10 may be constructed so it may be raised and lowered as a whole in directions indicated by arrows A and B, for example, wherein the end of arm 9 is provided with a gear system, which meshes with a pinion or driver that is operated by a handle or a winch, mounted in the support 7 for the arm 9.

In a further simplified embodiment, the spindle member with handle 12 may be eliminated and arm 11 may be manually moved relative to tube 10 in directions indicated by arrows C and D, and then affixed in place by set screw 13.

A support member 15 is pivotally mounted on a bearing 14 provided at the free end of arm 11 so as to be capable of longitudinal movement relative thereto. A pneumatic piston and cylinder combination or motor 16 is fastened to a carrier member 15 which is supported via trunnions from bearing 14. In a suitable manner, as illustrated, either centrally on piston rod 17 or otherwise, support member 15 supports a wheel housing 18 at its lower end that further rotatably supports an application wheel 19 so that wheel housing 18 is slidable via a tongue and groove arrangement in and along support member 15. Alternatively, wheel housing 18 may be supported by an articulated connection to carrier member 15.

To adapt the contact surface of application wheel 19 to the slant 20 of tire R, depending on the type and size of the tire, that is, to be able to vary the setting of angle alpha on support member 15, a nut 21 is pivotably mounted in support member 15, into which is guided a spindle 22, which may be rotated with a crank or wheel 23. In the embodiment illustrated, spindle 22 is mounted in a block connected by a tongue-in-groove structure to selected affixed positions on arm 11. In this manner, support member 15 may be angularly adjusted while it is supported from bearing 14. Also, piston rod 17 with wheel housing 18 and application wheel 19 are at the same time adjusted to various desired slant angles alpha. Thus, an approximate setting corresponding to any tire diameter, is established with arm 10 being moved in directions of arrows C and D and then secured, a fine setting corresponding to the angle of the tire surface is next obtained by further adjusting spindle 22 moving carrier member 15 in the directions corresponding to arrows E and F.

Figure 2:
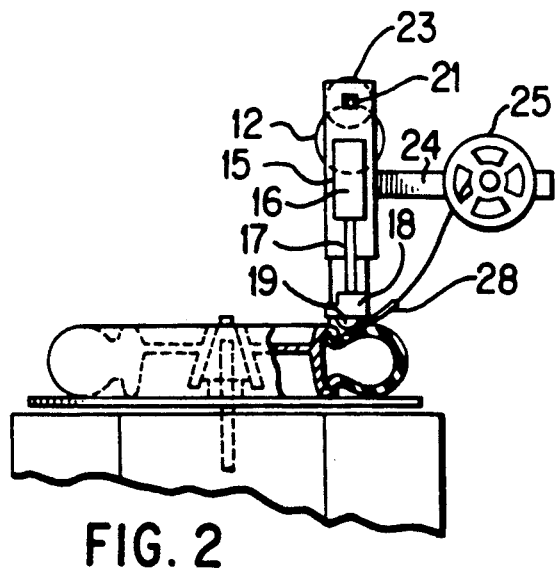
FIG. 2 is a front elevational view of the upper part of the apparatus of FIG. 1, seen in the direction of arrow II and in the same scale as FIG. 1.
Figure 4:
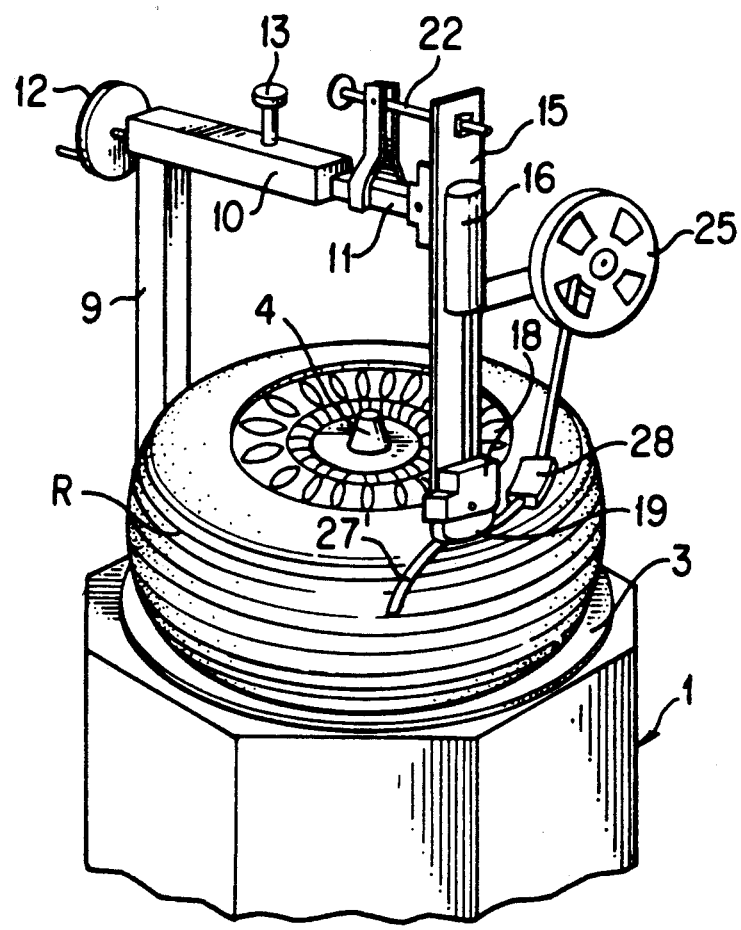
FIG. 4 is a perspective view of the upper part of the apparatus shown in FIGS. 1 and 2.

As seen in FIG. 2, a spool 25 is mounted from support member 15 by, for example, means of an arm 24, and a roll of a thin color strip of material 26 to be vulcanized by the present process onto the tire surface, is carried by spool 25 for application to tire R by application wheel 19.

Figure 3:
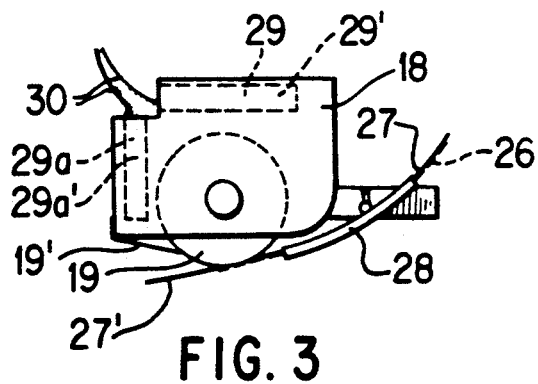
FIG. 3 is a detail view of the application wheel of the preferred embodiment as shown in FIG. 2 in larger scale.

A guide 28 secured on wheel housing 18 is provided to guide color strip 26, along with its backing layer 27, to the underside of application wheel 19, which is attached to wheel housing 18, as illustrated in FIG. 3. Following the application of the decorative strip 26, the backing layer 27 is discarded as waste or refuse 27'. A thin, flat spring-like stripper 19' mounted from housing 18 is provided to strip off the dirt that cakes onto the peripheral surface of the application wheel 19 and also to prevent backing layer refuse 27' from being subsequently wound onto wheel 19.

Guide 28 may comprise a curved aluminum channel piece mounted from housing 18 which carries and retains therein an interchangeable plastic insert that includes a groove molded to correspond to the width of color strip 26. That groove may be disposed in the plastic insert in a manner which is governed by whether the color strip 26 is to be applied in the middle of the tire sidewall surface, or is to be applied away from the middle. This plastic insert also prevents too much heat from being conducted from the application wheel 19 to the incoming strip 26.

Application wheel 19 is rotatably mounted in wheel housing 18 so that approximately two-thirds to three-quarters of same is located within the housing 18.

Figure 5:
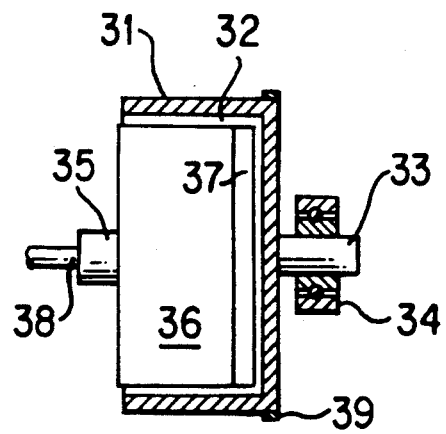
FIG. 5 is a vertical cross-sectional view of an application wheel of another embodiment in an enlarged scale.

Heating cartridges are also mounted in wheel housing 18. For instance, as illustrated in FIG. 5, four heating cartridges 29, 29' and 29a, 29a', are mounted, in pairs, which are connected to an electric current source by wire electrical conductors 30. As illustrated, the heating cartridges 29, 29' and 29a, 29a' are arranged at right angles to one another so they surround a substantial portion of the application wheel 19 to provided effective heating of same. Because the greater part of application wheel 19 is continually located within the space defined by housing 18, the application of thermal energy by cartridges 29, 29', 29a and 29a' by means of direct radiant heating suffices to increase the wheel's temperature to the approximately 150° C. required for vulcanization of strip 27 onto tire R.

The same effect is accomplished when heating cartridges 29, 29' in wheel housing 18 are placed across from cartridges 29a and 29' on opposite sides of application wheel 19.

FIG. 5 illustrates another embodiment for transferring thermal energy to application wheel 19. In this embodiment, application wheel 31 is cup-shaped, that is, substantially open on one side to form a hollow cavity 32. It is mounted on a journal 33 carried by ball bearings 34 mounted in housing 18 (not shown in this Figure). Within the hollow cavity 32 of application wheel 31, a block 36 is mounted rigidly via a shaft 35 from housing 18. The front area of block 36 incorporates a heating table 37, which receives an electrical current through connections points 38 to provide thermal energy.

FIG. 5 also illustrates an application wheel 31 provided with a milled edge or a row of shallow teeth 39, which are impressed into the side wall of tire R during the revolution of the tire R, thus preventing any lateral shifting of tire R during its rotation. This milled edge preferably lies on the side turned toward shaft 2. A similar edge or shallow teeth may be incorporated on application wheel 19.

A piston in a piston and cylinder type pneumatic motor 16 may be controlled through an air line (not shown), or other suitable means, by foot pedal 40 mounted from framework 1a, so that (depending on the dimensions of the pneumatic tire R and the physical characteristics of the tires' side surface) application wheel 19 may be forced down with pressure measuring from three to eight bar against the surface of the tire R, which itself retains its standard internal pressure of approximately two bar. As a result of the pressure of the application wheel 19 against tire R, via strips 26 and 27, and as a result of the thermal energy transferred from the wheel 19 to the vulcanizable color strip 26, such strip 26 is vulcanized onto the surface of tire R while the backing strip 27 is removed as refuse 27'. Thus tire R is rotated on table 3 under application wheel 19, at such a velocity that on a pneumatic tire R of standard dimensions, a decorative strip 26 of twenty millimeters width may be vulcanized securely onto its surface in ninety seconds.

Because the color strip 26 to be applied by this vulcanization process is very thin, and the pressure and heat applied by application wheel 19 is relatively high, the process of vulcanizing the decorative ring onto tire R requires no other initial treatment of its surface other than that of applying a so-called "chemical roughener," such as is commercially available under the trademark "Liquid Buffer", manufactured by Stahlgruder Otto Gruber GmbH, and, accordingly, no mechanical roughening or coating with a standard vulcanizing solution is required.

The control of the heating elements and temperatures, the electric motor and the pneumatic motor moving the rotating table, are familiar to the those acquainted with the art and are not, per se, subjects of this invention.

Decorative strips of different widths and colors may be applied without removing the pneumatic tire from its wheel, the annular application of the strip to the side surface of a tire being accomplished in a very short period of time without other pretreatment except, of course, cleaning the sidewalls of the tire as necessary. These decorative strips, according to their intended uses, not only form decorative rings of selected colors, but can constitute strips which are not simply rings, but bear inscriptions, labels, company or firm logos, various tire specifications such as prescribed air pressure, inspection dates, and the like. The apparatus was developed primarily for use in vulcanizing operations for tires already mounted on wheel rims and wherein the tires have been used to a greater or lesser extent. But it may also be useful to tire manufacturers and tire and automobile dealers, as well as for operations involving fleets of trucks or automobiles such as those owned by the larger businesses and by governments.

For the interest of clarity in the foregoing specification, only the application of decorative rings to vehicular tires is described, but the invention should not be understood as so limited.

Although I have described the preferred embodiments of my invention, it is to be understood it is capable of other adaptions and modifications within the scope of the appended claims.

Having thus disclosed my invention, what I claim as new and to be secured by Letters Patent of the United States is:

1. Apparatus for the application of decorative rings, inscriptions, labels, ornamental designs arranged in one or more concentric rings, to symmetrical articles comprising the visible surface lying adjacent to the tread of a pneumatic tire when mounted on a wheel, the apparatus comprising a horizontal rotatable table for supporting such a wheel mounted tire thereon, said table being rotated by a vertically disposed shaft rigidly connected to it, a heated application wheel mounted in a housing, means for forcing said heated application wheel against the rubber sidewall surface of a wheel-mounted tire supported thereon, and a vulcanizable color strip mounted on a backing layer carried on a spool disposed proximate said heated application wheel, said color strip adapted to be received between said heated application wheel and the sidewall surface of a wheel-mounted tire supported on the table and vulcanized to that tire by the application of said heated application wheel to the sidewall surface of that tire as it is frictionally horizontally supported on and rotated with said table, the free end of said shaft supporting a centering cone having a diameter corresponding to the diameter of the central opening of the wheel upon which the tire that said colored strip is to be applied to is mounted.

2. Apparatus as claimed in claim 1, wherein said centering cone is nonrotatably mounted on said shaft, is slidable in longitudinal directions on the end of said shaft to engage said shaft securely for rotation therewith, and is resiliently supported by a resilient means.

3. Apparatus for the application of decorative rings, inscriptions, labels, and ornamental designs, arranged in one or more concentric rings, to rotationally symmetrical articles comprising the visible surface lying adjacent to the tread of a pneumatic tire when filled with compressed air and mounted on a wheel, the apparatus comprising a horizontal rotatable table for frictionally supporting a compressed air filled tire mounted on a wheel thereon, a vertically disposed shaft rigidly connected to said table for continuously rotating said table at lest about 360° in one direction only, a heated application wheel mounted in a housing, means for forcing said heated application wheel against the elastic rubber sidewall surface of a compressed air filled wheel-mounted tire frictionally supported on the table, a heat transfer member in said housing for heating said application wheel to an operational temperature of approximately 150° C. and a vulcanizable color strip mounted on a backing layer carried on a spool disposed proximate said application wheel, said color strip adapted to be received between said heated application wheel and the sidewall surface of a compressed air filled wheel-mounted tire frictionally supported on the table and vulcanized to that tire by the application of said heated application wheel to the sidewall of that tire, a centering member extending upwardly from said table for being received in the center opening of the wheel upon which said compressed air filled tire is mounted, said centering member including means for causing the wheel's operational axis of rotation to coincide when the wheel is mounted on said table with said shaft's vertical axis of rotation, said centering member being mounted on said shaft in a non-rotatable relation therewith and slidable in longitudinal directions thereon while engaging said shaft securely for rotation therewith and also being resiliently supported on said table by a resilient means.

* * * * *